(12) United States Patent
Ho et al.

(10) Patent No.: US 9,684,141 B1
(45) Date of Patent: Jun. 20, 2017

(54) TECHNIQUES FOR REDUCING INGRESS OF FOREIGN MATTER INTO AN OPTICAL SUBASSEMBLY

(71) Applicant: Applied Optoelectronics, Inc., Sugar Land, TX (US)

(72) Inventors: I-Lung Ho, Sugar Land, TX (US); Hao-Hsiang Liao, Sugar Lane, TX (US); Justin Lii, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/137,794

(22) Filed: Apr. 25, 2016

(51) Int. Cl.
*G02B 6/42* (2006.01)

(52) U.S. Cl.
CPC ......... *G02B 6/4244* (2013.01); *G02B 6/4214* (2013.01); *G02B 6/4215* (2013.01); *G02B 6/4239* (2013.01); *G02B 6/4253* (2013.01)

(58) Field of Classification Search
None
See application file for complete search history.

(56) References Cited

U.S. PATENT DOCUMENTS

| | | | | |
|---|---|---|---|---|
| 4,611,884 A | * | 9/1986 | Roberts | G02B 6/2817 250/227.24 |
| 5,245,133 A | * | 9/1993 | DeCarlo | H02G 15/113 174/76 |
| 5,781,682 A | * | 7/1998 | Cohen | G02B 6/4249 385/89 |
| 2004/0033033 A1 | * | 2/2004 | Hoshino | G02B 6/4292 385/93 |
| 2006/0166407 A1 | * | 7/2006 | Kaushal | B81B 7/0041 438/115 |
| 2008/0193088 A1 | * | 8/2008 | Pfnuer | G02B 6/4206 385/92 |

FOREIGN PATENT DOCUMENTS

JP 2011-112771 A * 6/2011

* cited by examiner

*Primary Examiner* — Mike Stahl
(74) *Attorney, Agent, or Firm* — Grossman Tucker Perreault & Pfleger, PLLC; Norman S. Kinsella

(57) ABSTRACT

Techniques are disclosed for filling gaps formed between a press-fit component and an optical subassembly housing to introduce a seal or barrier that can prevent or otherwise mitigate the ingress of contaminants. In an embodiment, a layer of sealant material is applied to one or more surfaces of an optical component prior to press-fitting the component into an optical subassembly housing. Alternatively, or in addition to applying sealant to one or more surfaces of an optical component, a layer of sealant material may be disposed on an interface formed between an outer surface of the optical subassembly housing and the optical component press-fit into the same. Techniques disclosed herein are particularly well suited for small form-factor optical subassemblies that include one or more optical components press-fit into openings of a subassembly housing during manufacturing.

17 Claims, 7 Drawing Sheets

TECHNIQUES FOR REDUCING INGRESS OF FOREIGN MATTER INTO AN OPTICAL SUBASSEMBLY

TECHNICAL FIELD

The present disclosure relates to optical transceiver modules, and more particularly, to techniques for introducing a layer of sealant to fill gaps formed between friction-fit optical component assemblies and a housing of an optical subassembly.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As optical transceiver housings scale down in size, the complexity of designing and manufacturing TOSAs and ROSAs to fit within the constrained housings, without sacrificing channel allocation and transceiver performance, continues to increase and raises numerous non-trivial issues.

BRIEF DESCRIPTION OF THE DRAWINGS

These and other features and advantages will be better understood by reading the following detailed description, taken together with the drawings wherein.

Figure 1:
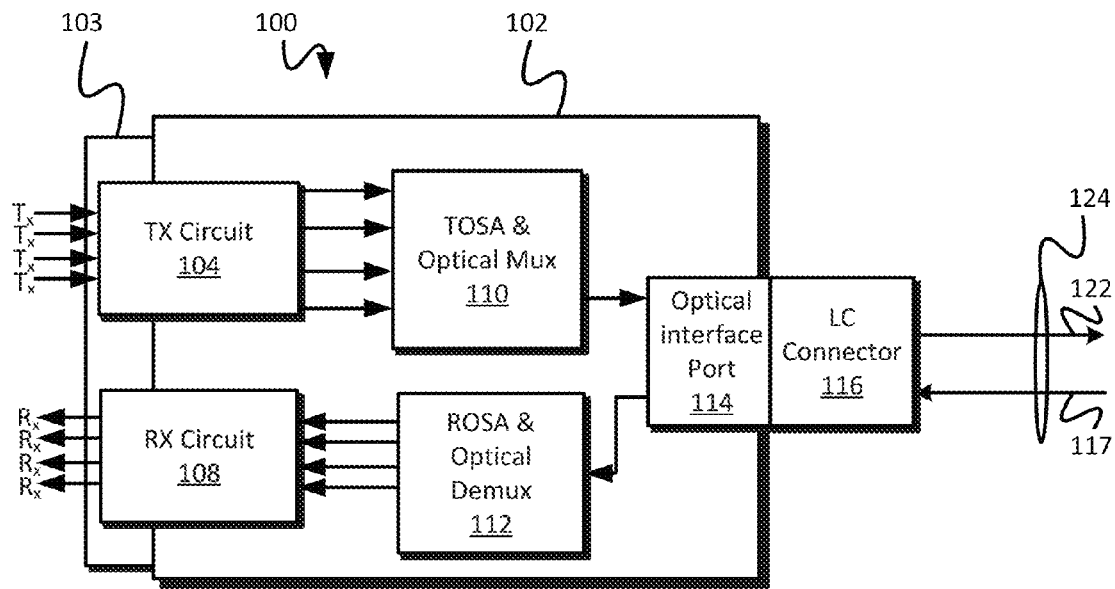
FIG. 1 schematically illustrates an example optical transceiver including a transmitter optical subassembly (TOSA) and a receiver optical subassembly (ROSA).

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

As previously discussed, the continued scaling, or shrinking, of optical transceivers and associated components present numerous non-trivial challenges. For example, in optical subassemblies, such as transmitter optical subassemblies (TOSAs) and receiver optical subassemblies (ROSAs), optical component assemblies may be press-fit into position and then precisely aligned, e.g., using active-alignment techniques, within particular manufacturing tolerances to ensure that an optical signal is received/transmitted without introducing an unacceptable amount of loss. Even a relatively small misalignment (e.g., a few microns) of the optical component assemblies can significantly reduce optical power. However, even with proper alignment, a press fit between an optical component assemblies and an optical subassembly housing can form gaps or paths that allow contaminants, e.g., smoke, dust, flux, and particulates, to enter and potentially degrade optical component assemblies. Such gaps may result from manufacturing tolerances and/or thermal expansion/contraction of the optical subassembly during thermal cycling. To this end, smoke, dust, and other particulate by-products of manufacturing may seep into the press-fit gaps and ultimately decrease optical performance.

Thus, in accordance with an embodiment of the present disclosure, techniques are disclosed for filling gaps formed between a press-fit component and an optical subassembly housing to introduce a seal or barrier that can prevent or otherwise mitigate the ingress of contaminants. While examples and scenarios disclosed herein specifically reference a TOSA, the techniques are equally applicable to any component press-fit into a housing. Moreover, the techniques disclosed herein are particularly well suited for small form-factor optical subassemblies that include one or more optical component assemblies press-fit into openings of a subassembly housing during manufacturing.

In an embodiment, application of sealant material may be performed at various stages during manufacturing of an optical subassembly such as, for example, prior to press-fitting an optical component assembly, or after press-fitting an optical component assembly, or both. For example, and in accordance with an embodiment, a technician may deposit sealant material onto one or more surfaces of an optical component assembly prior to press-fitting. In this embodiment, the technician can apply a layer of sealant around the one or more surfaces of the optical component assembly that come into contact with a housing of an optical subassembly, e.g., when the optical component assembly is press-fit into position. The deposited layer of sealant may form a conformal layer about the optical component assembly that can fill gaps and other imperfections about the periphery of the optical component assembly. However, any number of surfaces may be coated including those surfaces that do not necessarily come in contact with the housing of the optical subassembly. The technician may then press-fit the now-coated optical component assembly prior to the conformal layer fully curing, or after the conformal layer has cured. A partially-cured conformal layer may advantageously further conform to the surfaces of the optical subassembly housing, and thus, gap-fill potential throughholes that would otherwise allow ingress of contaminants into the optical subassembly. Alternatively, or in addition to depositing sealant material prior to press-fitting an optical component assembly, the technician may apply a layer of sealant material over an interface between an outer surface of the housing of the optical subassembly and a surface of the optical component assembly to, essentially, "gap fill" and form a barrier over any potential gaps/interstitial spaces between an optical component assembly and the housing.

In an embodiment, the sealant material is any suitable sealant/material that may be deposited onto an optical component assembly and used to minimize or otherwise reduce gaps that can form after press-fitting. Some example sealants include epoxy or any other material made, in whole or in part, from a class of synthetic thermosetting polymers containing epoxide groups, although other types of materials should be apparent in light of this disclosure. For example, adhesives, resins, plastics, paints, or any other suitable compound that can form a conformal layer may be utilized. In some specific example embodiments, the sealant material comprises a thermally conductive epoxy that includes aluminum oxide or other oxide that can provide high thermal conductivity and electrical isolation. In other example embodiments, the sealant material may comprise a relatively inexpensive glue or other adhesive compound. In some cases, a first type of sealant material may be applied prior to press-fitting and a second type of sealant material, different from the first type of sealant material, may be applied after press-fitting. For example, a first type of sealant material may be applied prior to press-fitting, and a second type of sealant material may be applied after press-fitting. The first and second type of sealant material may be chosen based on desired characteristics such as, for example, expansion after curing, thermal conductivity, e.g., to disperse heat from the optical component assembly to the housing of the optical subassembly, electrical isolation capabilities, shock absorption, and resistance to environmental humidity, just to name a few. In one embodiment, N number of layers of sealant material may be deposited before and/or after press-fitting to form a composite sealant layer having a desired thickness. In this embodiment, layers of sealant material may be cured to some extent before application of additional sealant layers.

Deposition of the sealant material may be automated and precisely controlled, or through manual application. In any such cases, deposition of the sealant material can include, for example, brush application, dipping the optical component assembly into the sealant material, spray coating the sealant material, or any other suitable approach to applying the sealant material. As previously discussed, any number of surfaces of an optical component assembly may be coated before/after press-fitting. Likewise, application of the sealant material may be limited to only a portion of those surfaces.

In one specific example embodiment, an optical subassembly, e.g., forming a ROSA, TOSA or other optical subassembly within an optical transceiver, may generally include a body having a plurality of sidewalls that define a cavity. The body can include an opening that is defined by sidewalls that extend from an external surface of the body into the cavity. The opening can at least partially receive a press-fit optical component assembly, with the press-fit optical component assembly being held in the opening based at least in part on friction between surfaces of the optical component assembly and the sidewalls defining the opening. A sealant layer or conformal layer may be disposed between surfaces of the sidewalls defining the opening and the surfaces of the optical component assembly which are opposite the same. Stated differently, the sealant layer may be disposed along an interface formed between surfaces of the optical component assembly and the surfaces of the optical subassembly housing. The sealant layer may extend an entire length and width of the surfaces of the optical component assembly, or less than the entire length and width depending on a desired configuration. The precise amount of sealant material applied is not particularly relevant so long as potential gaps, e.g., points of ingress, between the press-fit optical component assembly and housing of the optical subassembly are minimized or otherwise reduced and the dimensions of the optical component assembly remain within tolerance to allow for press-fitting.

As generally used herein, the term "layer" or "conformal layer" refers to a layer formed from one or more sealant materials. Multiple layers of a sealant material may be deposited to ultimately form a single layer. Moreover, two or more sealant material types may be deposited successively in a so-called "sandwich" fashion to form a composite layer. Thus the term layer does not necessarily refer to a single sealant material type or a specific number of layers, and instead refers to any number of individually deposited layers of sealant material that can form an overall layer for the purposes of filling gaps or other spaces that can otherwise operate as points of ingress for contaminants entering the housing of an optical subassembly.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid or course wavelength division multiplexing (CWDM). The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Example Optical Transceiver System and Operation

Turning now to FIG. 1, an embodiment of an optical transceiver 100 includes a TOSA 110 for transmitting an optical signal and a ROSA 112 for receiving an optical signal. In some embodiments, the TOSA 110 is a multi-channel TOSA and the ROSA 112 is a multi-channel ROSA.

As shown, a transceiver housing 102 includes the TOSA 110 and the ROSA 112. A transmit connecting circuit 104 and a receive connecting circuit 108 provide electrical connections to the TOSA 110 and the ROSA 112, respectively, within the transceiver housing 102. The transmit connecting circuit 104 and the receive connecting circuit 108 may communicate with external systems via data bus 103. In some cases, data bus 103 is a 38-pin connector that comports with, for example, specification SFF-8436 titled "QSFP+10 Gbs 4× PLUGGABLE TRANSCEIVER Rev. 4.8" (hereinafter "QSFP+").

In any event, the transmit connecting circuit 104 electrically couples to an electronic component in the TOSA 110 (e.g., a TO can laser package), and the receive connecting circuit 108 electrically couples to an electronic component (e.g., a photodiode package) in the ROSA 112. The transmit connecting circuit 104 and the receive connecting circuit 108 include at least conductive paths to provide electrical connections, and may also include additional circuitry. The TOSA 110 is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector port provides optical connections to the TOSA 110, and provides optical connections to the ROSA 112. The LC connector port may be configured to receive and be coupled to a mating LC connector 116 such that transmit optical fiber 122 of the external fibers 124 optically couples to the TOSA 110, and the receiver optical fiber 117 of the external fibers 124 optically couples to the ROSA 112.

The TOSA 110 includes at least one TO can laser package and at least one optic for producing at least one associated channel wavelength, and couples the same into the transmit optical fiber 122. In particular, the TOSA 110 converts electrical data signals received via the transmit connecting circuit 104 into modulated optical signals transmitted over transmit optical fiber 122 using at least one laser. The laser may be, for example, a distributed feedback (DFB) laser. The TOSA 110 may also include a monitor photodiode for monitoring the light emitted by the laser. The TOSA 110 may further include one or more temperature control devices, such as a resistive heater and/or a thermoelectric cooler (TEC), for controlling a temperature of the lasers, for example, to control or stabilize the laser wavelengths.

The ROSA 112 includes at least one photodiode package and an optical component assembly which provides support from an optical component coupled thereon such as a mirror or a filter for receiving an optical signal. The ROSA 112 can detect, amplify, and convert optical signals received via receive optical fiber 117, and can provide the converted optical signals as electrical data signals that are output via the receive connecting circuit 108. In some cases, the photodiode package includes an integrated transimpedance amplifier (TIA).

Figure 2:
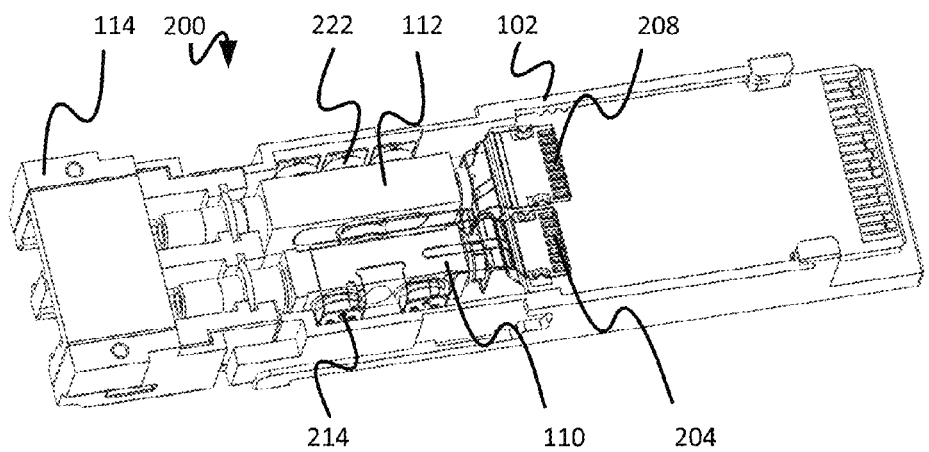
FIG. 2 is a perspective view of an example small form-factor (SFF) pluggable transceiver with a TOSA and a ROSA.

Referring also to FIG. 2, an example small form-factor (SFF) pluggable optical transceiver 200 with a TOSA and a ROSA is described and shown in greater detail. The embodiment shown in FIG. 2 is one example of the optical transceiver 100 of FIG. 1 implemented in a small form-factor. For example, the optical transceiver 200 may implement, for example, the QSFP+ specification. As shown, the optical transceiver 200 includes a transceiver housing 102, a TOSA 110 in one region of the housing 102, and a ROSA 112 located in another region of the housing 102. The TOSA 110 electrically couples to transmit flexible printed circuits (FPCs) 204 and couples to the optical interface port 114 at an end of the housing 102. The ROSA 112 electrically couples to a receive FPC 208 and couples to the optical interface port 114 at the end of the housing 102.

In some embodiments, the TOSA 110 includes at least one TO can laser package 214. Each TO can laser package 214 may include a laser diode. The output of the TO can laser package 214 may, for example, be in the range of 1.85 mW to 2 W; however, other output powers are within the scope of the current disclosure. The ROSA 112 includes at least one photodiode package 222. Each of the photodiode packages can include, for example, a photodiode and a TIA. In some embodiments, each of the photodiodes provides a sensitivity of approximately −13 dBm or less. Each TO can laser package 214 is optically coupled to a first optical fiber and each photodiode package 222 is optically coupled to a second optical fiber.

Example Processes and Architecture

Figure 3:
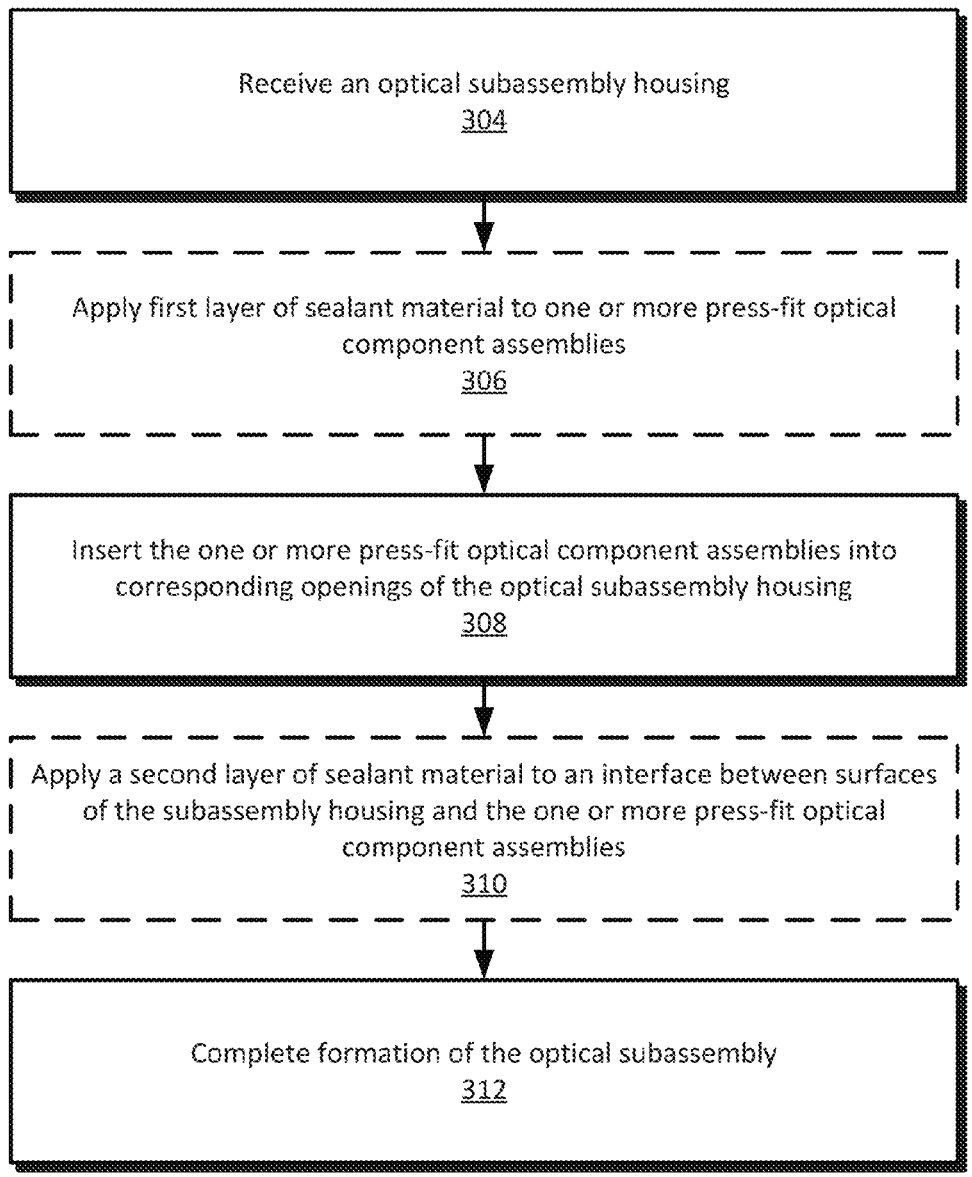
FIG. 3 shows an example process for forming an optical subassembly in accordance with some embodiments of the present disclosure.

As previously discussed, a process for reducing the ingress of contaminants during assembly of an optical subassembly is disclosed herein. One such example process 300 is shown in FIG. 3. The example process 300 may be performed by a manufacturing process utilizing, for example, automated equipment (e.g., pick-and-place machines, robotics) and/or manually by a manufacturing technician. Although the process 300 discussed below is directed to assembling a multi-channel TOSA, the process 300 is equally applicable to the assembly of other subassemblies that utilize press-fit components, e.g., ROSAs, with minor modifications. Thus, acts may be substituted, omitted, or otherwise modified depending on a desired subassembly. The process 300 includes acts of receiving an optical subassembly housing, optionally applying a first layer of sealant material to one or more press-fit optical component assemblies, inserting the one or more press-fit optical component assemblies into corresponding openings of the optical subassembly housing, optionally applying a second layer of sealant material to an interface between surfaces of the subassembly housing and the one or more press-fit optical component assemblies, and completing formation of the optical subassembly.

Figure 4:
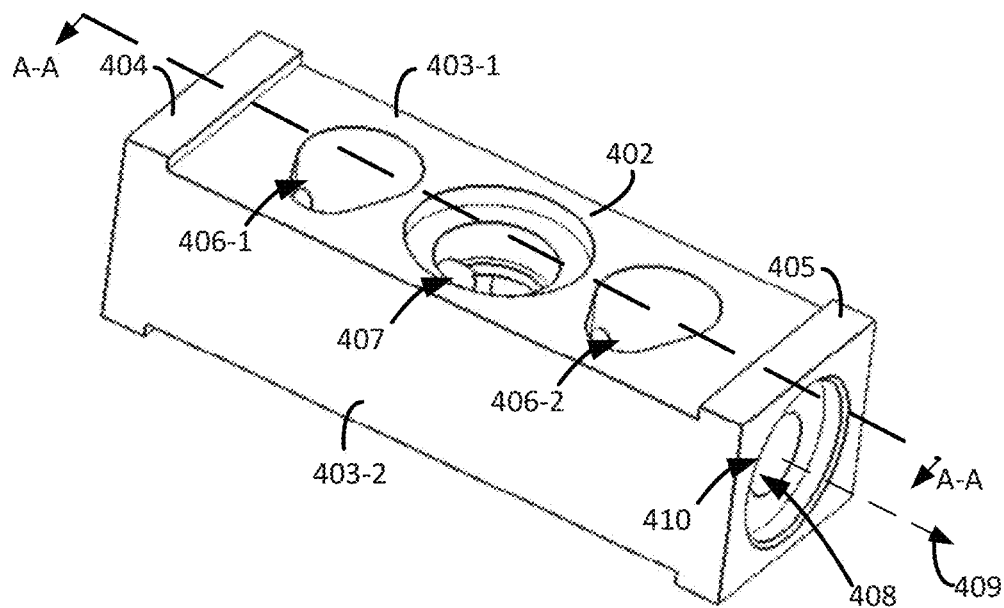
FIG. 4 shows a perspective view of an optical subassembly housing having one or more openings configured to couple to press-fit optical component assemblies, in accordance with an embodiment of the present disclosure.

In act 304, the process receives an optical subassembly housing. One such example optical subassembly housing 402 is shown in FIG. 4, in accordance with an embodiment. As shown, the housing 402 is defined by a plurality of sidewalls including at least sidewalls 403-1 and 403-2. The plurality of sidewalls can extend from a first end 404 to a second end 405 and may define a cavity 408 there between. The optical subassembly housing 402 can include one or more openings along the plurality of sidewalls such as, for example, opening 406-1, 406-2 and opening 410. One or more of the openings, such as opening 406-1 and 406-2 may be designed to receive press-fit optical component assemblies such as, for example, those providing filters (and filter holder mounts), mirrors, lasers, and so on. Other openings, such as the opening 407 and 410 may also be designed to receive an optical component assembly and couple to the same by friction or welding, or both. In any event, optical component assemblies may be coupled to the optical subassembly housing 402 and align with an optical light path 409 (FIG. 5) that extends longitudinally within the cavity 408 from the first end 404 to the second end 405.

Figure 5:
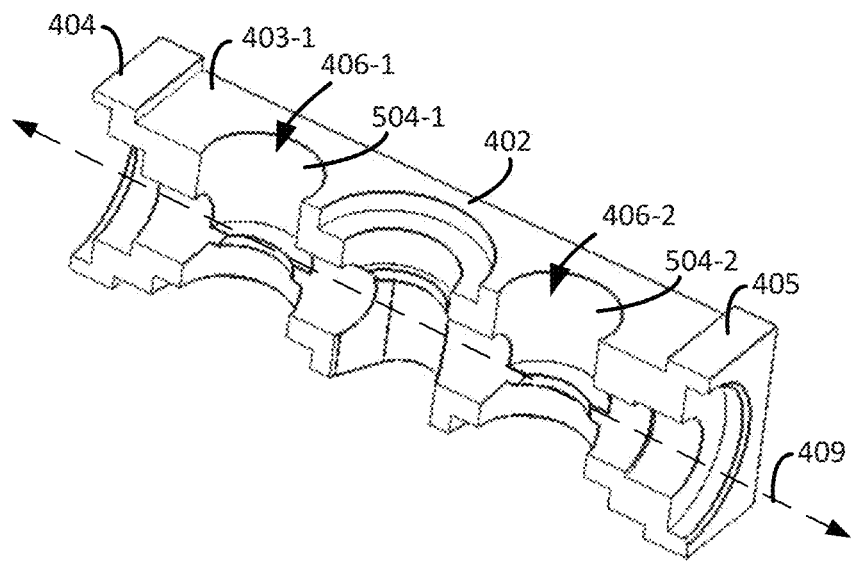
FIG. 5 shows an example cross-sectional view of the optical subassembly housing of FIG. 4 taken along the line A-A.

Turning to FIG. 5, a cross-sectional view of the optical subassembly housing 402 taken along the line A-A of FIG. 4 is shown. As shown, each of the openings 406-1 and 406-2 is defined by an intersection between an outer surface of the sidewall 403-1 and the surface of least one sidewall, e.g., sidewall 504-1 and 504-2, that extends substantially perpendicular into the cavity 408 of the optical subassembly housing 402. As discussed above, the cavity 408 of the optical subassembly can define a light path 409 whereby optical components associated with the optical component assemblies can launch/receive optical signals.

Figure 6:
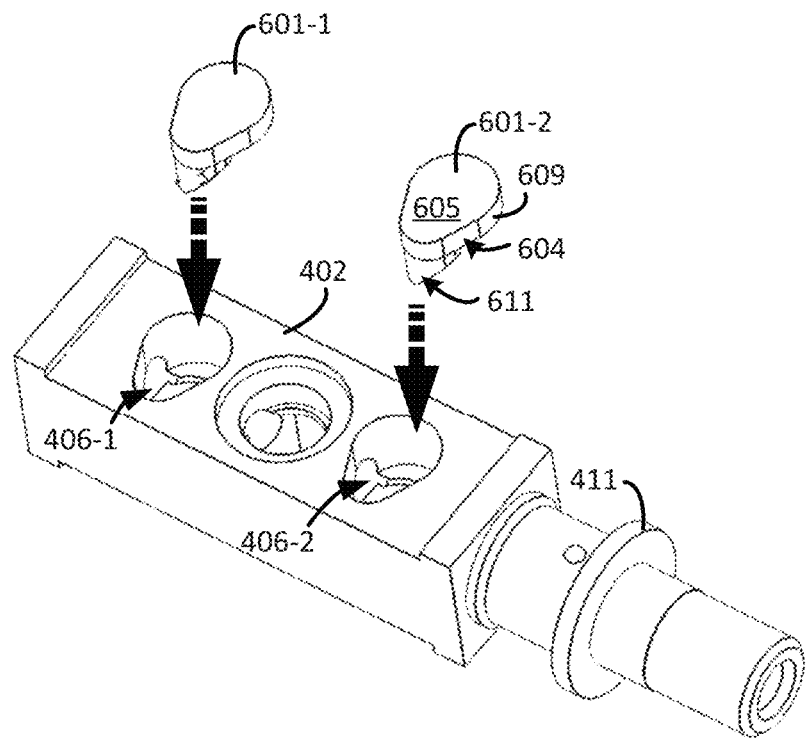
FIG. 6 shows a perspective view of the optical subassembly housing of FIG. 4 and a plurality of optical component assemblies aligned to be press-fit into openings of the same, in accordance with an embodiment of the present disclosure.

Returning to FIG. 3, and in act 306, the process optionally applies a first layer of sealant material to one or more press-fit optical component assemblies. For example, as shown in FIG. 6 with additional reference to FIG. 5, optical component assemblies 601-1 and 601-2 can each be configured to press-fit into respective ones of the openings 406-1 and 406-2. As shown, each of the optical component assemblies 601-1 and 601-2 can include a base portion 605 that is defined by at least one sidewall 609. An optical component 611, such as a filter or mirror, for instance, may be mounted on a surface provided by the base portion 605. Thus prior to insertion of the optical component assemblies 601-1 and 601-2 into the openings 406-1 and 406-2, the process may dispose a layer of sealant material along one or more surfaces of each optical component assembly 601-1 and 601-2, and more particularly, those surfaces that come into contact with surfaces defining a respective opening, e.g., openings 406-1 and 406-2. For example, surface 604 of the sidewall 609 may come into contact with and couple by friction to a surface of the sidewall 504-2 defining the opening 406-2. The layer of sealant material may conform to the surfaces of each optical component assembly, and thus, fill imperfections or other surface features that may potentially form gaps/interstitial spaces that allow contaminants to enter the cavity 408. While the optical component assemblies 601-1 and 601-2 are illustrated as filter and filter holder components having a generally rounded shape, this disclosure should not be construed as limited in this regard. For example, a layer of sealant may be applied to other components having various other shapes and configurations.

Application of the sealant material generally excludes sensitive regions of optical component assemblies, e.g., optical filter elements, mirrors, and so on, that may become damaged or otherwise degraded. In some embodiments, the application of the sealant may be substantially uniform across each surface of an optical component assembly that comes into contact with surfaces of the optical subassembly housing 402, such as surface 604. Application of sealant in this manner may form a substantially continuous ring or barrier. In some embodiments, the sealant does not completely circumscribe an optical component assembly and instead may be applied selectively around the periphery of a component, e.g., in a non-continuous fashion, or at least on portions of surfaces that may come into contact with the optical subassembly housing 402.

Alternatively, or in addition to applying the sealant material to an optical component assembly, the sealant may be selectively applied to surfaces defining each opening, e.g., openings 406-1 and 406-2, such that the sealant does not interfere with (e.g., contact) sensitive optical components (e.g., such as a filter or mirror). In some cases, application of the sealant material is substantially uniform around the surfaces defining each opening of the optical subassembly housing 402. In other embodiments, only a portion of the surfaces defining the openings includes sealant material.

When the sealant material is applied to either or both of the surfaces defining each opening of the optical subassembly housing 402 and surfaces of each optical component assembly, the layer of sealant material may change the effective width of each opening of the optical subassembly housing and/or the effective width of each optical component assembly. As such, when the sealant material is applied prior to the formation of the press fit, the sealant may be understood to form part of the press fit.

Additionally, in some embodiments, multiple layers of sealant may be applied to surfaces defining each opening of the optical subassembly housing 402 and/or surfaces of each optical component assembly. For example, a first layer of sealant material may be applied and allowed to at least partially cure. Then, a second layer of sealant material may be applied to the at least partially cured layer of sealant. Additional layers may be applied in this manner until a desired thickness of sealant is obtained. By increasing the thickness of the sealant, the width of each opening and/or associated optical component assemblies may be fine-tuned and brought within a predefined tolerance.

In some cases, the sealant may essentially provide negligible or minute structural support. In other words, the sealant may provide substantially no benefits to the retention of an optical component assembly within openings of the optical subassembly housing 402. As such, each optical component assembly may be coupled to the optical subassembly housing substantially by friction, for example. Therefore, techniques disclosed herein may include the use of even those sealants having minimal or no adhesive/structural properties.

The particular sealant material applied may be selected based upon various associated mechanical properties. For example, the thermal expansion coefficient of a given optical component assembly may be different than the thermal expansion coefficient of the optical subassembly housing 402. As a result, as the temperature fluctuates, the sealant material may experience a strain. Therefore, some embodiments may utilize a sealant material having elastic properties and/or a thermal expansion coefficient that minimizes the strain experienced. For example, the sealant may be selected such that its thermal expansion coefficient and/or elasticity is sufficient to prevent or reduce the formation of spaces and/or gaps. In some embodiments, the rate of thermal expansion/contraction of the sealant may be substantially equivalent to the rate of expansion/contraction of the spaces and/or gaps. To the extent that the thermal expansion coefficient does not allow for the sealant to expand or contract at the necessary rates, the sealant may have an elasticity sufficient to prevent the formation of spaces and/or gaps.

Figure 7A:
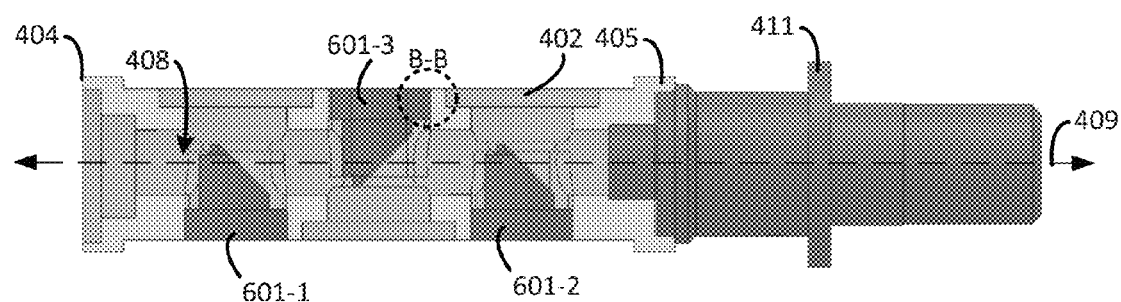
FIG. 7A shows an example cross-sectional view of the optical subassembly housing of FIG. 4 taken along the line A-A after press-fitting one or more optical component assemblies into the same, in accordance with an embodiment of the present disclosure.

Returning to FIG. 3, and in act 308, the process inserts the one or more press-fit optical component assemblies into corresponding openings of the optical subassembly housing 402. FIG. 7A shows a cross-sectional view of the optical subassembly housing 402 taken along the line A-A of FIG. 4 after performance of act 308, in accordance with an embodiment. As shown, optical component assemblies such as the optical component assemblies 601-1 to 601-3 and the optical coupling receptacle 411 couple to the optical subassembly housing 402 at least partially by friction-fit. When inserted into the optical subassembly housing 402, the optical component assemblies associated with each optical component assembly may then optically align with the optical path 409 that can extend substantially longitudinally from the first end 404 to the second 405 of the optical subassembly housing 402.

As shown, surfaces of the optical subassembly housing contacts and surrounds generally the periphery of the optical component assemblies 601-3 and holds the same in place at least in part by friction. However, even in embodiments where the press fit completely circumscribes the optical component assemblies, interstitial spaces and/or gaps may form at an interface between surfaces of the optical subassembly housing and sidewalls of the optical component assembly. These interstitial gaps/spaces may form as a result of, for example, manufacturing tolerances, material imperfections, and thermal expansion/contraction, just to name a few. The presence of spaces and/or gaps can allow contaminates (e.g., smoke, solder, flux, thermal paste, particulates) to enter the cavity 408 of the optical subassembly housing and degrade overall performance of an optical subassembly.

Figure 7B:
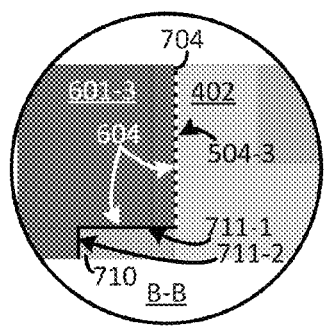
FIG. 7B shows an enlarged region of the optical subassembly housing of FIG. 7A in accordance with an embodiment of the present disclosure.

Thus, and accordance with an embodiment, application of the sealant material layer in act 306 of process 300 can "gap-fill" such gaps or spaces to minimize or otherwise reduce potential avenues of ingress for contaminates. The sealant material layer may also be accurately referred to as an interstitial filler. For example, FIG. 7B illustrates an enlarged region of the optical subassembly housing 402 of FIG. 7A labeled B-B. As shown, the optical component assembly 601-3 includes surfaces generally indicated at 604 that come into contact with and form an interface with surfaces of the optical subassembly housing, and more particularly, surfaces of the sidewall 504-3. As also shown, the optical subassembly housing 402 can include a step region 710 that may support the optical component assembly 601-3 and ensure insertion of the same only to a predefined extent into the optical subassembly housing 402. Likewise, the optical component assembly 601-3 may include a base portion defining a step or flange to mate or otherwise be held in place by the step region 710. The step region 710 can provide additional surfaces 711-1 and 711-2 that may also form a portion of the interface with the surfaces of the optical component assembly 601-3 generally indicated at 604.

Thus the interface between the optical component assembly 601-3 and the optical subassembly housing 402 can include a plurality of surfaces, with each surface extending at various angles depending on the configuration of the opening and the associated optical component assembly. For example, and as shown, the interface indicated at generally 704 extends vertically, e.g., zero degrees, towards and intersects with surface 711-1, with surface 711-1 extending substantially perpendicular, e.g., 90 degrees, relative to the vertical interface. Likewise, surface 711-2 extends substantially perpendicular from surface 711-1. Thus as should be apparent, an interface between an optical component assembly and an optical subassembly housing is not necessarily a single continuous surface.

However, and as previously discussed, such an interface can form gaps that may provide a point of ingress for contaminates into the cavity 408 of the optical subassembly housing 402. Accordingly, application of the sealant material layer can provide a sealant layer 704 that extends at least partially along the interface between the optical component assembly 601-3 and the optical subassembly housing 402. For example, and as shown in FIG. 7B, the sealant layer 704 extends generally along vertical surfaces of the optical component assembly 601-3 generally indicated at 604. The layer 704 may be accurately understood as an internal sealant layer. The sealant layer 704 may not necessarily extend continuously along a given surface and may be intermittently disposed due to, for example, friction displacing the sealant material during press-fitting of the optical component assembly 601-3 and/or based on how the sealant material was selectively applied. In any event, at least a portion of the vertical surfaces defining the optical component assembly 601-3 can include the sealant layer 704. The sealant layer 704 may circumscribe substantially the entire optical component assembly 601-3 to form a ring or seal around the same. The ring or seal may extend in a continuous, or non-continuous fashion based on displacement of sealant material during press-fitting of the optical component assembly 601-3 and/or based on selective application of sealant material.

Figure 7C:
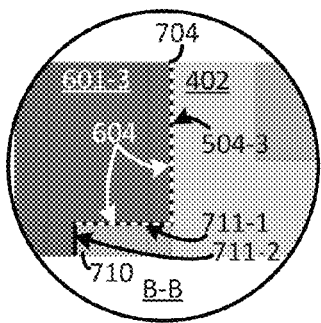
FIG. 7C shows the enlarged region of the optical subassembly housing of FIG. 7A in accordance with another embodiment of the present disclosure.

Turning to FIG. 7C, the enlarged region of the optical subassembly housing 402 of FIG. 7A labeled B-B is shown with the sealant layer 704 extending along both vertical and horizontal surfaces generally indicated at 604 that comprise the interface between the optical component assembly 601-3 and the optical subassembly housing 402. The sealant layer 704 may not necessarily form a continuous layer, as discussed above.

Figure 7D:
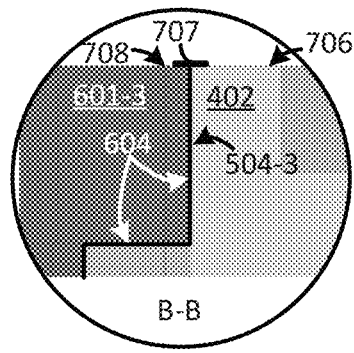
FIG. 7D shows the enlarged region of the optical subassembly housing of FIG. 7A in accordance with yet another embodiment of the present disclosure.

Returning to FIG. 3, and in act 310, the process may optionally apply a second layer of sealant material to an interface between surfaces of the optical subassembly housing 402 and the one or more press-fit optical component assemblies. For example, FIG. 7D illustrates a layer of sealant material 707 disposed on both an outer surface 706 of the optical subassembly housing 402 and an outer surface 708 of the optical component assembly 601-3 to at least partially cover the interface between the optical component assembly 601-3 and the optical subassembly housing 402. Thus the layer of sealant material 707 may be accurately understood as an external sealant layer.

Figure 7E:
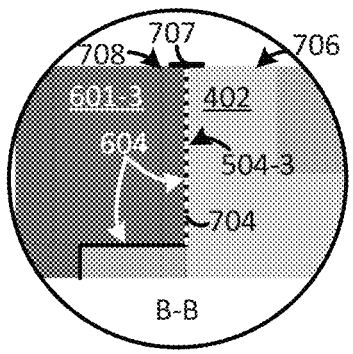
FIG. 7E shows the enlarged region of the optical subassembly housing of FIG. 7A, in accordance with still yet another embodiment of the present disclosure.

FIG. 7E shows another embodiment including the external sealant layer 707 in combination with an internal sealant layer 704 that extends at least partially along the surfaces indicated generally at 604. The embodiment shown in FIG. 7E can result after applying both the first and the second sealant material layers as discussed above with regard to acts 306 and 310.

Figure 7F:
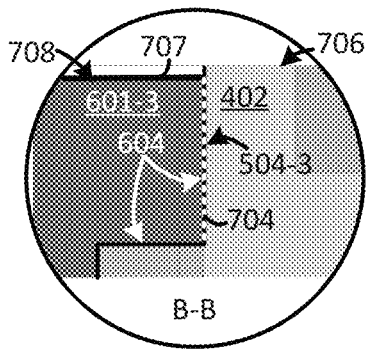
FIG. 7F shows the enlarged region of the optical subassembly housing of FIG. 7A including a countersunk optical component assembly press-fit into the same, in accordance with an embodiment of the present disclosure.

FIG. 7F shows another embodiment including a countersunk optical component assembly 601-3. As shown, the press-fit optical component assembly 601-3 includes a surface 708 which is recessed from the outer surface 706 of the optical subassembly housing 402. In this embodiment, the sealant material layer 707 may be applied, e.g. during act 310, along the surface 708 of the optical component assembly 601-3 to form an external seal.

Thus the sealant material may be applied at a plurality of stages during the process 300 and can result in a layer of sealant material being internally and/or externally deposited to reduce/eliminate ingress of contaminants.

Figure 8:
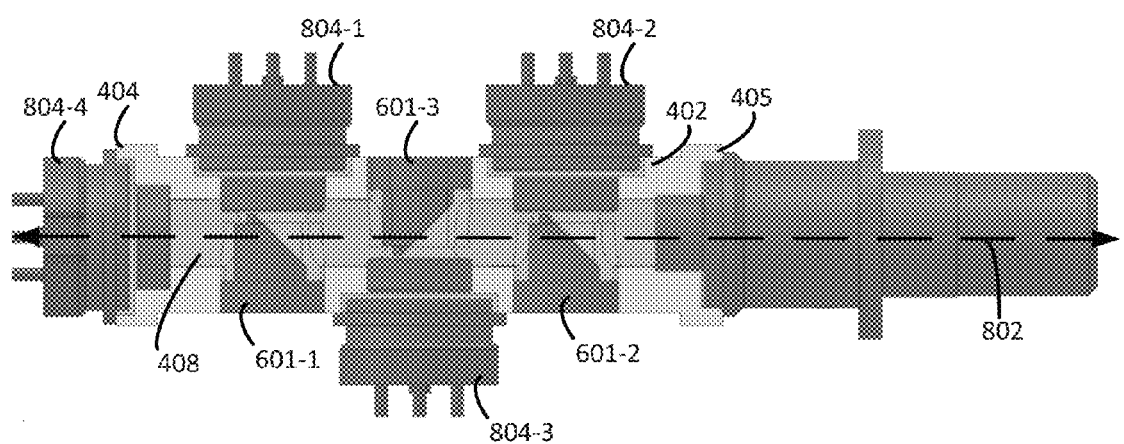
FIG. 8 shows a partially cross-sectional view of a transmit optical subassembly (TOSA) formed in accordance with the example process of FIG. 3.

Returning to FIG. 3, and in act 312, the process completes formation of the optical subassembly. For example, FIG. 8 shows the optical subassembly housing 402 fully assembled as the multi-channel TOSA 110 in accordance with the process 300. As shown, the multi-channel TOSA 110 includes the optical subassembly housing 402 with a plurality of sidewalls extending generally in parallel along the longitudinal axis 802 from the first end 404 to the second end 405, and forming a compartment/cavity 408 defined by an inner surface within the optical subassembly housing 402. The multi-channel TOSA 110 is illustrated with a semi-transparent housing 402 for the purposes of clarity and practicality. As shown, the optical component assemblies 601-1 to 601-3 are configured as filter assemblies which are press-fit into the housing 402. The multi-channel TOSA 110 further includes a plurality of TO can laser packages 804-1 to 804-4 coupled to the house 402. Filters of the optical component assemblies 601-1 to 601-3 can optically align and couple to a light path that generally extends along the longitudinal axis 802. Likewise, the TO can laser packages 804-1 to 804-4 can optically align and couple respective laser devices with the light path. Thus, in use, the multi-channel TOSA 110 can multiplex multiple channel wavelengths and launch the same along the light path to transmit the multiplexed signal via, for instance, the transmit optical fiber 122 (FIG. 1).

In accordance with another aspect of the present disclosure, an optical transceiver is disclosed. The optical transceiver comprising a transceiver housing, and a first optical subassembly comprising a receiver optical subassembly (ROSA) or a transmitter optical subassembly (TOSA), the first optical subassembly comprising a housing having a plurality of sidewalls that provide a cavity there between, an opening defined by at least one surface of the plurality of sidewalls that extends from an outer surface of the housing to the cavity, an optical component assembly at least partially disposed within the opening, the optical component assembly being held in the opening at least in part based on an interference fit formed between the optical component assembly and the at least one surface of the plurality of sidewalls that define the opening, and a first sealant layer disposed along an interface formed between a surface of the optical component assembly and the at least one surface defining the opening in order to reduce ingress of contaminants into the cavity, a second optical subassembly comprising the other of the ROSA or the TOSA.

Although the foregoing examples and scenarios specifically reference a TOSA, the present disclosure is also intended to apply to other subassemblies and components including a ROSA, for example. One example ROSA particularly well suited for the techniques disclosed herein is disclosed in U.S. patent application Ser. No. 14/974,492 entitled "Optical Filter Sub-Assembly Cartridge For Use in a Receiver Optical Subassembly (ROSA) Housing" filed on Dec. 18, 2015 which is incorporated herein by reference in its entirety. Additionally, the techniques variously disclosed herein may be used in combination with virtually any device or component in which press-fit components may form gaps or other spaces that allow contaminates into sensitive areas of the device/component.

In accordance with an aspect of the present disclosure, an optical subassembly is disclosed. The optical subassembly comprising a housing having a plurality of sidewalls that provide a cavity there between, an opening defined by at least one surface of the plurality of sidewalls that extends from an outer surface of the housing to the cavity, an optical component assembly at least partially disposed within the opening, the optical component being held in the opening at least in part based on an interference fit formed between the optical component assembly and the at least one surface of the plurality of sidewalls that define the opening, and a sealant layer disposed along an interface formed between a surface of the optical component assembly and the at least one surface defining the opening in order to reduce ingress of contaminants into the cavity.

In accordance with another aspect of the present disclosure a method is disclosed. The method comprises receiving an optical subassembly housing, applying a first layer of sealant material to one or more press-fit optical component assemblies, and inserting the one or more press-fit optical component assemblies into corresponding openings of the optical subassembly housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical subassembly comprising:
a housing having a plurality of sidewalls that provide a cavity there between;
an opening defined by at least one surface of the plurality of sidewalls that extends from an outer surface of the housing to the cavity;
an optical component assembly at least partially disposed within the opening, the optical component assembly being held in the opening at least in part based on an interference fit formed between the optical component assembly and the at least one surface of the plurality of sidewalls that define the opening;
a sealant layer disposed along an interface formed between a surface of the optical component assembly and the at least one surface defining the opening in order to reduce ingress of contaminants into the cavity; and
an external layer of sealant material disposed on an interface between an outer surface of a sidewall of the plurality of sidewalls and an outer surface of the optical component assembly.

2. The optical subassembly of claim 1, wherein the sealant layer is formed from an epoxy.

3. The optical subassembly of claim 2, wherein the epoxy is a thermally-conductive epoxy.

4. The optical subassembly of claim 1, wherein the at least one surface defining the opening comprises a first surface and a second surface, the second surface extending substantially perpendicular to the first surface.

5. The optical subassembly of claim 4, wherein at least a portion of the first and second surfaces include the sealant layer disposed thereon.

6. The optical subassembly of claim 1, wherein the sealant layer is disposed in a non-continuous fashion along the interface formed between a surface of the optical component assembly and the at least one surface.

7. The optical subassembly of claim 1, wherein the sealant layer is disposed in a continuous fashion such that the sealant layer surrounds the optical component assembly.

8. The optical subassembly of claim 1, wherein the cavity provides a light path extending longitudinally from a first end of the housing to a second end.

9. The optical subassembly of claim 8, wherein the optical component assembly comprises a filter arrangement, and wherein a filter element of the filter arrangement is optically coupled with the light path in response to the optical component assembly being disposed within the opening.

10. The optical subassembly of claim 9, wherein the sealant layer is not in contact with the filter element.

11. The optical subassembly of claim 1, wherein the sealant layer is a composite layer.

12. The optical subassembly of claim 1, wherein the sealant layer provides structural support and provides at least some friction to hold the optical component assembly in the opening via the interference fit.

13. The optical subassembly of claim 1, wherein the optical subassembly comprises a transmitter optical subassembly (TOSA) or a receiver optical subassembly (ROSA).

14. An optical transceiver comprising:
a transceiver housing; and
a first optical subassembly comprising a receiver optical subassembly (ROSA) or a transmitter optical subassembly (TOSA), the first optical subassembly comprising:

a housing having a plurality of sidewalls that provide a cavity there between;

an opening defined by at least one surface of the plurality of sidewalls that extends from an outer surface of the housing to the cavity;

an optical component assembly at least partially disposed within the opening, the optical component assembly being held in the opening at least in part based on an interference fit formed between the optical component assembly and the at least one surface of the plurality of sidewalls that define the opening; and a first sealant layer disposed along an interface formed between a surface of the optical component assembly and the at least one surface defining the opening in order to reduce ingress of contaminants into the cavity;

a second optical subassembly comprising the other of the ROSA or the TOSA, the second optical subassembly comprising:

a housing having a plurality of sidewalls that provide a cavity there between;

an opening defined by at least one surface of the plurality of sidewalls that extends from an outer surface of the housing to the cavity;

an optical component assembly at least partially disposed within the opening, the optical component assembly being held in the opening at least in part based on an interference fit formed between the optical component assembly and the at least one surface of the plurality of sidewalls that define the opening; and a second sealant layer disposed along an interface formed between a surface of the optical component assembly and the at least one surface defining the opening in order to reduce ingress of contaminants into the cavity.

15. The optical subassembly of claim 14, wherein the first sealant layer is formed from an epoxy.

16. A method for forming an optical subassembly, the method comprising:

receiving an optical subassembly housing;

applying a first layer of sealant material to one or more press-fit optical component assemblies;

inserting the one or more press-fit optical component assemblies into corresponding openings of the optical subassembly housing; and applying a second layer of sealant material on an interface formed between an external surface of the optical subassembly housing and an external surface of the one or more press-fit optical component assemblies.

17. The method of claim 16, wherein the sealant material comprises an epoxy.

* * * * *